US012372892B2

(12) United States Patent
Danno et al.

(10) Patent No.: US 12,372,892 B2
(45) Date of Patent: Jul. 29, 2025

(54) TONER PARTICLE WITH AMORPHOUS POLYESTER RESIN

(71) Applicant: HEWLETT-PACKARD DEVELOPMENT COMPANY, L.P., Spring, TX (US)

(72) Inventors: Takahiro Danno, Kanagawa (JP); Osamu Ieda, Kanagawa (JP); Keiichi Ishikawa, Kanagawa (JP); Akinori Terada, Kanagawa (JP); Keiji Komoto, Kanagawa (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 666 days.

(21) Appl. No.: 17/765,136

(22) PCT Filed: Oct. 19, 2020

(86) PCT No.: PCT/US2020/056323
§ 371 (c)(1),
(2) Date: Mar. 30, 2022

(87) PCT Pub. No.: WO2021/080919
PCT Pub. Date: Apr. 29, 2021

(65) Prior Publication Data

US 2022/0357679 A1 Nov. 10, 2022

(30) Foreign Application Priority Data

Oct. 25, 2019 (JP) ................................ 2019-194570

(51) Int. Cl.
*G03G 9/087* (2006.01)
*G03G 9/093* (2006.01)

(52) U.S. Cl.
CPC ..... *G03G 9/08755* (2013.01); *G03G 9/08795* (2013.01); *G03G 9/08797* (2013.01); *G03G 9/09371* (2013.01)

(58) Field of Classification Search
CPC ........... G03G 9/08755; G03G 9/08795; G03G 9/08797; G03G 9/09371
See application file for complete search history.

(56) References Cited

U.S. PATENT DOCUMENTS 8,883,387 B2 11/2014 Miyata et al.
8,932,789 B2 1/2015 Sugimoto et al.
(Continued)

FOREIGN PATENT DOCUMENTS

JP 2012-63559 A 3/2012
JP 2019-70752 A 5/2019
(Continued)

OTHER PUBLICATIONS

English Translation of JP-2012063559 (Year: 2012).*

*Primary Examiner* — Stewart A Fraser
(74) *Attorney, Agent, or Firm* — Brooks, Cameron & Huebsch, PLLC

(57) ABSTRACT

A toner particle comprising: a binder resin; a colorant; and a wax, wherein the binder resin comprises: a first amorphous polyester resin having a pendant group; a second amorphous polyester resin having no pendant group; and a crystalline polyester resin, and wherein a difference between a Solubility Parameter (SP) value of the first amorphous polyester resin and an SP value of the second amorphous polyester resin is 0.3 or more.

20 Claims, 1 Drawing Sheet

(56) References Cited

U.S. PATENT DOCUMENTS

| | | | | |
|---|---|---|---|---|
| 10,133,199 | B2 | 11/2018 | Hong | |
| 2013/0273471 | A1* | 10/2013 | Sacripante | G03G 9/09357<br>977/773 |
| 2017/0315463 | A1 | 11/2017 | Onozaki et al. | |

FOREIGN PATENT DOCUMENTS

| | | | |
|---|---|---|---|
| KR | 10-1674783 | B1 | 11/2016 |
| WO | WO-2020/018177 | A1 | 1/2020 |

* cited by examiner

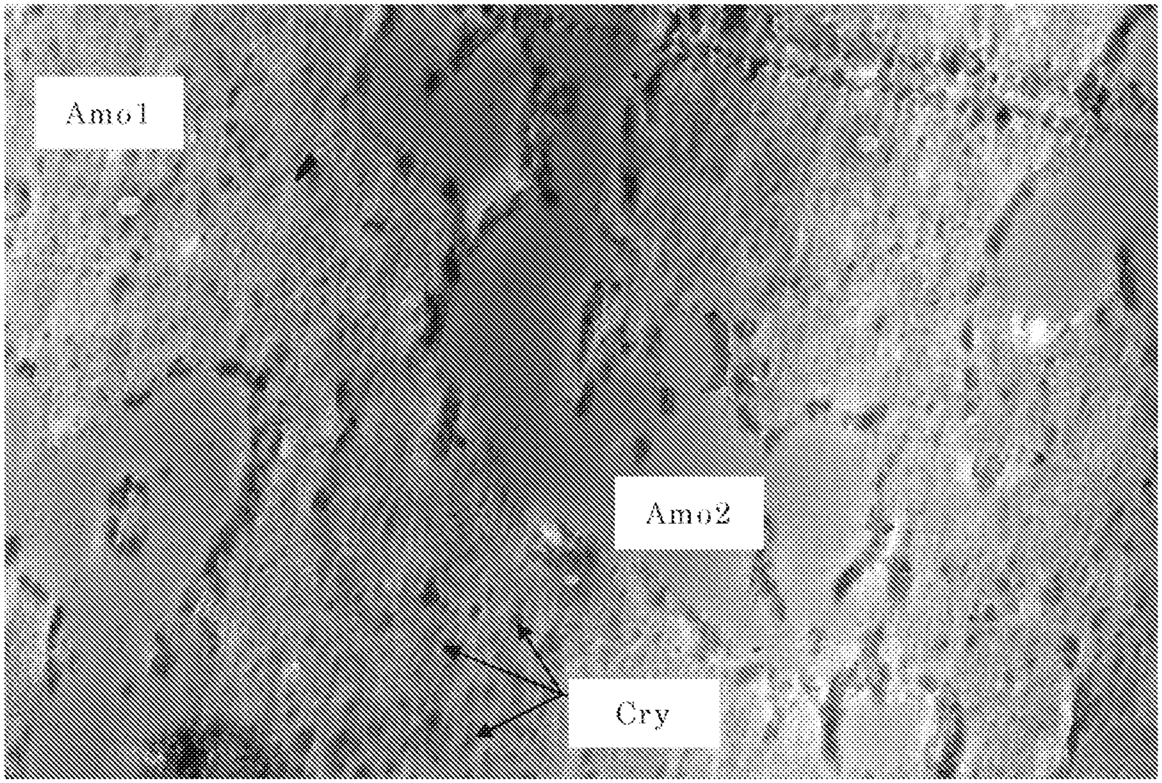
Amo1
Amo2
Cry

TONER PARTICLE WITH AMORPHOUS POLYESTER RESIN

BACKGROUND ART

Methods for visualizing image information through electrostatically charged images, such as electrophotography, have been utilized in a variety of fields. In electrophotography, the surface of a photoreceptor is uniformly charged, subsequently an electrostatically charged image is formed on this photoreceptor surface, an electrostatic latent image is developed with a developer including toner particles, and thereby the electrostatic latent image is visualized as a toner image. Then, this toner image is transferred and fixed onto the surface of a recording medium, and thereby an image is formed. As the developer to be used herein, a two-component developer composed of toner particles and a carrier, and a one-component developer that uses a magnetic toner or a non-magnetic toner alone are known.

BRIEF DESCRIPTION OF DRAWINGS

FIG. 1 is a TEM image showing an example of the toner particle.

DESCRIPTION OF EMBODIMENTS

<Toner Particle>

In the following description, an embodiment of a toner particle will be described. The toner particle according to an embodiment contain a binder resin, a colorant, and a wax.

[Binder Resin]

The binder resin includes a first amorphous polyester resin having a pendant group, a second amorphous polyester resin having no pendant group, and a crystalline polyester resin. It is desirable that the amorphous polyester resin is a polyester resin which does not have a clear endothermic peak in differential scanning calorimetry (DSC). The amorphous polyester resin may be defined as, for example, a polyester resin showing a stepwise endothermic change when measurement is made by differential scanning calorimetry at a rate of temperature increase of 10° C./min, or a polyester resin having an endothermic peak with a half-value width of more than 15° C.

The amorphous polyester resin is, for example, a reaction product of a polyhydric alcohol and a polycarboxylic acid. In other words, the amorphous polyester resin contains a polyhydric alcohol and a polycarboxylic acid as monomer units.

The first amorphous polyester resin contains, as monomer units, for example, a polyhydric alcohol; a first polycarboxylic acid having a branch chain having 3 or more carbon atoms; and a second polycarboxylic acid that does not have a branch chain having 3 or more carbon atoms. The branch chain in the first polycarboxylic acid constitutes a pendant group for the first amorphous polyester resin.

The polyhydric alcohol may be, for example, a diol. Examples of the diol include aliphatic diols such as ethylene glycol, diethylene glycol, triethylene glycol, propylene glycol, butanediol, hexanediol, neopentyl glycol, and glycerin; alicyclic diols such as cyclohexanediol, cyclohexanedimethanol, and hydrogenated bisphenol A; and aromatic diols such as an ethylene oxide adduct of bisphenol A and a propylene oxide adduct of bisphenol A. These polyhydric alcohols are used singly or in combination of two or more kinds thereof. The diol is preferably an aromatic diol or an alicyclic diol, and more preferably an aromatic diol. From the viewpoint of forming a crosslinked structure or a branched structure in order to secure satisfactory fixability, the polyhydric alcohol may further include, in addition to a diol, a polyhydric alcohol having a valency of 3 or higher (for example, glycerin, trimethylolpropane, or pentaerythritol).

The content of the polyhydric alcohol may be 45% by mole or more, 47% by mole or more, or 50% by mole or more, and may be 55% by mole or less, 53% by mole or less, or 51% by mole or less, based on the total amount of the monomer units in the first amorphous polyester resin.

The branch chain in the first polycarboxylic acid means, when a chain having two carboxyl groups in a polycarboxylic acid is employed as the main chain, a chain that is branched out from this main chain. The branch chain may be a chain-like hydrocarbon group and may be, for example, an alkyl group or an alkenyl group. The number of carbon atoms of the branch chain may be 4 or more, 6 or more, 8 or more, 10 or more, 12 or more, 14 or more, 16, or 18 or more, and may be 32 or less, 30 or less, 28 or less, 26 or less, 24 or less, 22 or less, 20 or less, 18 or less, 16 or less, 14 or less, or 12 or less.

The first polycarboxylic acid may be, for example, a dicarboxylic acid having a branch chain having 3 or more carbon atoms, and is to include an anhydride of a dicarboxylic acid having a branch chain having 3 or more carbon atoms. Examples of the first polycarboxylic acid include a succinic acid having an alkyl group having 3 or more carbon atoms, a succinic acid having an alkenyl group having 3 or more carbon atoms, an alkyl bis(succinic acid) having an alkyl group having 3 or more carbon atoms, an alkenyl bis(succinic acid) having an alkenyl group having 3 or more carbon atoms, and anhydrides thereof. Specific examples of the polycarboxylic acid include octyl succinic acid, decyl succinic acid, dodecyl succinic acid, tetradecyl succinic acid, hexadecyl succinic acid, octadecyl succinic acid, isooctadecyl succinic acid, hexenyl succinic acid, octenyl succinic acid, decenyl succinic acid, dodecenyl succinic acid, tetrapropenyl succinic acid, tetradecenyl succinic acid, hexadecenyl succinic acid, isooctadecenyl succinic acid, octadecenyl succinic acid, and nonenyl succinic acid. These first polycarboxylic acids are used singly or in combination of two or more kinds thereof.

From the viewpoint of enhancing the dispersibility of the crystalline polyester resin in the first amorphous polyester resin, the content of the first polycarboxylic acid may be preferably 1% by mole or more, 1.5% by mole or more, or 2% by mole or more, and may be 15% by mole or less, 12% by mole or less, 10% by mole or less, 9% by mole or less, or 8% by mole or less, based on the total amount of the monomer units in the first amorphous polyester resin.

The second polycarboxylic acid may be, for example, a dicarboxylic acid that does not have a branch chain having 3 or more carbon atoms, and is to include an anhydride of a dicarboxylic acid that does not have a branch chain having 3 or more carbon atoms. Examples of the second polycarboxylic acid include adipic acid, phthalic acid, isophthalic acid, terephthalic acid, tetrachlorophthalic acid, chlorophthalic acid, nitrophthalic acid, p-carboxyphenylacetic acid, p-phenylene-2-acetic acid, m-phenylene diglycolic acid, p-phenylene diglycolic acid, o-phenylene diglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, cyclohexane dicarboxylic acid, and anhydrides of these. These second polycarboxylic acids are used singly or in combination of two or more kinds thereof.

The second polycarboxylic acid may also be a polycarboxylic acid having a valency of 3 or higher, which does not have a branch chain having 3 or more carbon atoms. Examples of this polycarboxylic acid include trimellitic acid, pyromellitic acid, naphthalene tricarboxylic acid, naphthalene tetracarboxylic acid, pyrene tricarboxylic acid, pyrene tetracarboxylic acid, and acid anhydrides, acid chlorides, or esters of these carboxylic acids.

The content of the second polycarboxylic acid may be 30% by mole or more, 32% by mole or more, or 34% by mole or more, and 52% by mole or less, 50% by mole or less, or 48% by mole or less, based on the total amount of the monomer units in the first amorphous polyester resin.

From the viewpoint of enhancing the dispersibility of the crystalline polyester resin in the first amorphous polyester resin, the weight average molecular weight of the first amorphous polyester resin may be preferably 5,000 or more, 6,000 or more, or 8,000 or more, and may be 40,000 or less, 30,000 or less, 25,000 or less, 18,000 or less, or 16,000 or less.

The weight average molecular weight of the first amorphous polyester resin according to the present specification is measured according to gel permeation chromatography (GPC) of a tetrahydrofuran (THF)-soluble fraction. Specifically, for example, the weight average molecular weight may be determined by the following method. Waters e2695 (manufactured by Nihon Waters K.K.) is used as a measuring apparatus, and two sets of Inertsil CN-3 25 cm (manufactured by GL Sciences, Inc.) are used as columns. A filtrate obtained by introducing 10 mg of a first amorphous polyester resin into 10 mL of tetrahydrofuran (THF) (containing a stabilizer, manufactured by Wako Pure Chemical Industries, Ltd.), stirring the mixture for one hour, and then filtering the mixture through a 0.2 μm filter, is used as a sample. A sample solution in tetrahydrofuran (THF) is injected into the measuring apparatus in an amount of 20 μL, and measurement is made under the conditions of 40° C. and a flow rate of 1.0 mL/min.

The glass transition temperature (Tg) of the first amorphous polyester resin may be 50° C. or higher and may be 80° C. or lower or 70° C. or lower.

The content of the first amorphous polyester resin may be 55% by mass or more, 70% by mass or more, or 80% by mass or more, and may be 92% by mass or less, 90% by mass or less, 85% by mass or less, or 80% by mass or less, based on the total amount of the binder resin. The content of the first amorphous polyester resin may be 48% by mass or more or 56% by mass or more, and may be 72% by mass or less or 64% by mass or less, based on the total amount of the toner particle.

The second amorphous polyester resin contains a polyhydric alcohol and a polycarboxylic acid that does not have a branch chain having 3 or more carbon atoms as monomer units. Specific examples of the polyhydric alcohol and the polycarboxylic acid that does not have a branch chain having 3 or more carbon atoms are similar to the polyhydric alcohols and the polycarboxylic acid that does not have a branch chain having 3 or more carbon atoms (second polycarboxylic acid) described for the first amorphous polyester resin, respectively. Regarding the polyhydric alcohol and the polycarboxylic acid that does not have a branch chain having 3 or more carbon atoms, which are included in the second amorphous polyester resin, one kind or two or more kinds thereof may be employed, respectively.

The content of the polyhydric alcohol may be 45% by mole or more, 47% by mole or more, or 50% by mole or more, and may be 55% by mole or less, 53% by mole or less, or 51% by mole or less, based on the total amount of the monomer units in the second amorphous polyester resin.

The content of the polycarboxylic acid that does not have a branch chain having 3 or more carbon atoms may be 45% by mole or more, 47% by mole or more, or 49% by mole or more, and may be 55% by mole or less, 53% by mole or less, or 50% by mole or less, based on the total amount of the monomer units in the second amorphous polyester resin.

From the viewpoint that a decrease in the strength of the binder resin and a decrease in the glass transition temperature of the toner particle can be suppressed, and that low-temperature fixability, the intensity of images fixed on paper, and the preservability of the toner particle can be enhanced, the weight average molecular weight of the second amorphous polyester resin may be preferably 30,000 or more, 40,000 or more, or 50,000 or more, and may be 80,000 or less, 70,000 or less, or 60,000 or less. The weight average molecular weight of the second amorphous polyester resin is measured by the same method as that for the weight average molecular weight of the first amorphous polyester resin.

The content of the second amorphous polyester resin may be 24% by mass or more, 30% by mass or more, or 34% by mass or more, and may be 40% by mass or less, 38% by mass or less, 36% by mass or less, or 34% by mass or less, based on the total amount of the binder resin. The content of the second amorphous polyester resin may be 20% by mass or more or 24% by mass or more, and may be 31% by mass or less or 27% by mass or less, based on the total amount of the toner particle.

According to an embodiment, the first amorphous polyester resin and the second amorphous polyester resin are respectively selected from the various amorphous polyester resins mentioned above by taking the solubility parameter (SP) values into account. Specifically, it is preferable that the difference (ΔSP value) between the SP value of the first amorphous polyester resin and the SP value of the second amorphous polyester resin is 0.3 or more. The ΔSP value may be preferably 0.35 or more, 0.4 or more, or 0.45 or more, and may be, for example, 2 or less.

It is desirable that the SP value of the first amorphous polyester resin and the SP value of the second amorphous polyester resin are selected such that the ΔSP value falls in the range described above, and there are no particular limitations. The SP value of the first amorphous polyester resin may be, for example, 10.0 or more, 10.2 or more, or 10.4 or more, and may be 12.0 or less, 11.8 or less, or 11.6 or less. The SP value of the second amorphous polyester resin may be, for example, 10.0 or more, 10.2 or more, or 10.4 or more, and may be 12.0 or less, 11.8 or less, or 11.6 or less.

The SP values of the first and second amorphous polyester resins are defined as the values determined from the monomer composition by Fedors calculation formula:

$$SP\ \text{value}=(\Sigma\Delta e/\Sigma\Delta v)^{1/2}$$

wherein Δe represents the evaporation energy of an atom or an atomic group; and Δv represents the molar volume of an atom or an atomic group. The SP values of the first and second amorphous polyester resins can be arbitrarily controlled by, for example, adjusting the amounts of ester groups in the resins. For example, in a case in which the polyhydric alcohol includes a propylene oxide adduct of bisphenol A and an ethylene oxide adduct of bisphenol A, the SP values can be adjusted by adjusting the ratio of the contents thereof.

The mass ratio of the content of the first amorphous polyester resin to the content of the second amorphous polyester resin (content (mass) of first amorphous polyester resin/content (mass) of second amorphous polyester resin) may be preferably 60/40 or higher, 65/35 or higher, or 70/30 or higher, and may be 90/10 or lower, 80/20 or lower, or 70/30 or lower.

The total content of the first amorphous polyester resin and the second amorphous polyester resin may be 55% by mass or more, 70% by mass or more, or 80% by mass or more, and may be 92% by mass or less, 90% by mass or less, 85% by mass or less, or 80% by mass or less, based on the total amount of the binder resin. The total content of the first amorphous polyester resin and the second amorphous polyester resin may be 48% by mass or more or 56% by mass or more, and may be 72% by mass or less or 64% by mass or less, based on the total amount of the toner particle.

The crystalline polyester resin may be a polyester resin having a clear endothermic peak in modified differential scanning calorimetry (MDSC). When the binder resin includes a crystalline polyester resin, enhancement of the image glossiness of the toner and enhancement of the low-temperature fixability can be promoted.

A crystalline polyester resin is, for example, a reaction product between a polyhydric alcohol and a polycarboxylic acid. In other words, a crystalline polyester resin includes a polyhydric alcohol and a polycarboxylic acid as monomer units.

It is desirable that the polyhydric alcohol is, for example, a diol. From the viewpoint that a crystalline polyester having an appropriate melting point for the toner particle is easily formed, the number of carbon atoms of the polyhydric alcohol may be preferably 8 or more or 9 or more, may be 12 or less or 10 or less, and may be 9 or 10. Examples of the polyhydric alcohol include 1,9-nonanediol.

The polycarboxylic acid may be, for example, an aliphatic polycarboxylic acid, and may be a dicarboxylic acid. From the viewpoint that linearity of the structure of the crystalline polyester resin increases, and the affinity with the first amorphous polyester resin is enhanced, the polycarboxylic acid is preferably an aliphatic dicarboxylic acid. From the viewpoint that a crystalline polyester having an appropriate melting point for the toner particle is easily formed, the number of carbon atoms of the polycarboxylic acid (provided that the number of carbons except for the carbons constituting a carboxyl group) may be preferably 8 or more or 9 or more, may be 12 or less or 10 or less, and may be 9 or 10. Examples of the polycarboxylic acid include 1,10-decane dicarboxylic acid and 1,12-dodecane dicarboxylic acid.

From the viewpoint that a decrease in the strength of the binder resin and a decrease in the glass transition temperature of the toner particle can be suppressed, and that low-temperature fixability, the intensity of images fixed on paper, and the preservability of the toner particle can be enhanced, the weight average molecular weight of the crystalline polyester resin may be preferably 5,000 or more, 5,100 or more, or 5,400 or more, and may be 15,000 or less, 10,000 or less, 8,000 or less, 5,900 or less, or 5,700 or less. The weight average molecular weight of the crystalline polyester resin is measured by the same method as that for the weight average molecular weight of the first amorphous polyester resin.

From the viewpoint that aggregation of the toner particles can be suppressed, and that the preservability of fixed images and the low-temperature fixability can be enhanced, the melting temperature (Tm) of the crystalline polyester may be preferably 55° C. or higher and may be 100° C. or lower or 75° C. or lower.

It is preferable that the crystalline polyester resin has particular Tg2nd-dH in a differential scanning calorimetric curve measured using a modified differential scanning calorimeter (MDSC). From the viewpoint that a decrease in the strength of the binder resin and a decrease in the glass transition temperature of the toner particle can be suppressed, and that low-temperature fixability, the intensity of images fixed on paper, and the preservability of the toner particle can be enhanced, Tg2nd-dH of the crystalline polyester resin may be preferably 25 J/g or higher or 40 J/g or higher.

Here, the Tg2nd-dH of a crystalline polyester resin is the amount of endothermic energy of the polyester resin measured at the second time using a modified differential scanning calorimeter (MDSC). The Tg2nd-dH can be determined by, for example, the following method. For a crystalline polyester resin, temperature increase is carried out as a first temperature increase process, using a modified differential scanning calorimeter Q2000 (manufactured by TA Instruments, Inc.), from room temperature to 140° C. at a modulation amplitude of 0.1° C., a modulation cycle of 10 seconds, and a rate of 3° C. per minute, and after completion, the temperature is decreased to 0° C. at a rate of 20° C. per minute. The temperature is held at 0° C. for 5 minutes, and then temperature increase is carried out again as a second temperature increase process from 0° C. to 140° C. at a modulation amplitude of 0.1° C., a modulation cycle of 10 seconds, and a rate of 3° C. per minute. Thus, dH is determined from a differential scanning calorimetric curve thus obtained.

The content of the crystalline polyester resin may be 8% by mass or more, 10% by mass or more, or 12% by mass or more, and may be 30% by mass or less or 20% by mass or less, based on the total amount of the binder resin. The content of the crystalline polyester resin may be 6% by mass or more or 8% by mass or more, and may be 20% by mass or less or 10% by mass or less, based on the total amount of the toner particle.

The mass ratio of the content of the amorphous polyester resins to the content of the crystalline polyester resins (content (mass) of amorphous polyester resins/content (mass) of crystalline polyester resins) may be 80/20 or higher or 85/15 or higher, and may be 95/5 or lower or 90/10 or lower.

The binder resin may consist of the first amorphous polyester resin, the second amorphous polyester resin, and the crystalline polyester resin, or may further include other resins in addition to the first amorphous polyester resin, second amorphous polyester resin, and crystalline polyester resin.

Examples of the other resins may include a styrene-(meth)acrylic copolymer, an epoxy resin, and a styrene-butadiene copolymer. The styrene-(meth)acrylic copolymer may be a copolymer of a styrene-based monomer and a (meth)acrylic acid ester-based monomer. Examples of the styrene-based monomer include styrene, o- (m-, p-) methylstyrene and m- (p-) ethylstyrene. Examples of the (meth)acrylic acid ester-based monomer include methyl (meth)acrylate, ethyl (meth)acrylate, propyl (meth)acrylate, butyl (meth)acrylate, octyl (meth)acrylate, dodecyl (meth)acrylate, stearyl (meth)acrylate, behenyl (meth)acrylate, 2-ethylhexyl (meth)acrylate, dimethylaminoethyl (meth)acrylate, and diethylaminoethyl (meth)acrylate.

The total content of the first amorphous polyester resin, second amorphous polyester resin, and crystalline polyester resin in the binder resin may be 80% by mass or more, 85% by mass or more, or 90% by mass or more, and may be 98% by mass or less or 95% by mass or less, based on the total amount of the binder resin.

The Tg2nd-dH of the binder resin may be 5 J/g or higher, 10 J/g or higher, 14 J/g or higher, or 15 J/g or higher, and may be 50 J/g or lower, 40 J/g or lower, 25 J/g or lower, 19 J/g or lower, or 18 J/g or lower. The Tg2nd-dH of the binder resin may be understood as, for example, an index representing the compatibility between the first amorphous polyester resin and the crystalline polyester resin. The Tg2nd-dH of the binder resin is measured by the same method as that for the Tg2nd-dH of the crystalline polyester resin.

The content of the binder resin in the toner particle may be 40% by mass or more, 45% by mass or more, or 50% by mass or more, and may be 90% by mass or less, 85% by mass or less, or 75% by mass or less, based on the total amount of the toner particle.

[Colorant]

The colorant can include at least one colorant selected from, for example, a black colorant, a cyan colorant, a magenta colorant, and a yellow colorant. Regarding the colorant, one kind is used alone, or two or more kinds are used as a mixture, in consideration of hue, chroma, brightness, weather-resistance, dispersibility in toner, and the like.

The black colorant may be carbon black or aniline black. The yellow colorant may be a condensed nitrogen compound, an isoindolinone compound, an anthraquine compound, an azo metal complex, or an allylimide compound. Specific examples of the yellow colorant include C.I. Pigment Yellow 12, 13, 14, 17, 62, 74, 83, 93, 94, 95, 109, 110, 111, 128, 129, 147, 168, and 180.

The magenta colorant may be a condensed nitrogen compound, anthraquine, a quinacridone compound, a basic dye lake compound, a naphthol compound, a benzimidazole compound, a thioindigo compound, or a perylene compound. Specific examples of the magenta colorant include C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

The cyan colorant may be a copper phthalocyanine compound or a derivative thereof, an anthraquine compound, or the like. Specific examples of the cyan colorant include C.I. Pigment Blue 1, 7, 15, 15:1, 15:2, 15:3, 15:4, 60, 62, and 66.

From the viewpoint of sufficiently exhibiting a coloration effect, the content of the colorant may be preferably 0.5% by mass or more, 1% by mass or more, or 2% by mass or more, based on the total amount of the toner particle, and from the viewpoint that a sufficient amount of frictional electrification can be obtained without having significant influence on the increase in the production cost of the toner particle, the content of the colorant may be preferably 15% by mass or less, 12% by mass or less, or 10% by mass or less, based on the total amount of the toner particle.

[Wax]

A wax can function as, for example, a mold release agent. Since a mold release agent enhances low-temperature fixability, final image durability, and abrasion resistance characteristics of the toner particle, the type and content of the wax that serves as a mold release agent can be determined by taking the characteristics of the toner into account.

The wax may be a natural wax or a synthetic wax. The type of the wax is not limited to these; however, the wax can be selected from the group consisting of, for example, a polyethylene-based wax, a polypropylene-based wax, a silicon wax, a paraffin-based wax, an ester-based wax, a carnauba wax, beeswax, and a metallocene wax. More specific examples include solid paraffin wax, microwax, rice wax, a fatty acid amide-based wax, a fatty acid-based wax, an aliphatic monoketone, a fatty acid metal salt-based wax, a fatty acid ester-based wax, a partially saponified fatty acid ester-based wax, a silicone varnish, a higher alcohol, and camauba wax. Furthermore, a polyolefin such as a low-molecular weight polyethylene or polypropylene, or the like can also be used.

The wax may be an ester-based wax containing an ester group. Specific examples thereof include, for example, a mixture of an ester-based wax and a non-ester-based wax, and an ester group-containing wax obtained by incorporating an ester group into a non-ester-based wax.

With regard to an ester-based wax component, since an ester group has high affinity with a latex component of toner particle, wax can be made to be uniformly present in the toner particle, and the action of the wax is allowed to be effectively exhibited. A non-ester-based wax component tends to be capable of suppressing the excessive plasticizing action in a case in which the wax is composed of ester-based waxes only, as a result of mold release action with latex. Consequently, a mixture of an ester-based wax and a non-ester-based wax tends to be capable of maintaining satisfactory developability of toner for a long period of time.

The ester-based wax may be an ester of a fatty acid having 15 to 30 carbon atoms and a monohydric alcohol to a pentahydric alcohol, such as behenyl behenate, stearyl stearate, stearic acid ester of pentaerythritol, and montanic acid glyceride. The alcohol component constituting the ester may be a monohydric alcohol having 10 to 30 carbon atoms or a polyhydric alcohol having 3 to 30 carbon atoms. Examples of the non-ester-based wax include a polyethylene-based wax, a polypropylene-based wax, a silicon wax, and a paraffin-based wax.

Examples of the ester-based wax containing an ester group include a mixture of a paraffin-based wax and an ester-based wax, and an ester group-containing paraffin-based wax, and specific examples thereof include, for example, product names P-212, P-280, P-318, P-319, and P-419 of CHUKYO YUSHI CO., LTD.

In a case in which the wax is a mixture of a paraffin-based wax and an ester-based wax, from the viewpoint that the compatibility with a latex that is used at the time of production of toner particles is sufficiently maintained, the content of the ester-based wax may be preferably 1% by mass or more, 5% by mass or more, 10% by mass or more, or 15% by mass or more, based on the total amount of the mixture of a paraffin-based wax and an ester-based wax, and from the viewpoint that plasticity of the toner particle becomes appropriate and that long-term maintenance of developability can be secured, the content of the ester-based wax may be preferably 50% by mass or less based on the total amount of the toner particle.

The melting temperature of the wax may be 60° C. or higher or 70° C. or higher, and may be 100° C. or lower or 90° C. or lower. The wax component may be a component that physically adheres tightly to toner particle but does not form covalent bonding with the toner particle.

From the viewpoint of suppressing a plasticization phenomenon between the binder resin and the wax, the wax may have an SP value, the difference of which with the solubility parameter (SP) value of the binder resin is 2 or larger.

From the viewpoint that low-temperature fixability is satisfactory and that the fixing temperature range is sufficiently secured, the content of the wax may be preferably 1% by mass or more, 2% by mass or more, or 3% by mass or more, based on the total amount of the toner particle, and from the viewpoint of having excellent preservability and economic efficiency, the content of the wax may be preferably 20% by mass or less, 16% by mass or less, or 12% by mass or less, based on the total amount of the toner particle.

[Other Components]

The toner particle may further include a charge control agent as necessary. The charge control agent may be internally added or externally added to the toner particle. The charge control agent may be a negative charge control agent or a positive charge control agent.

Examples of the negative charge control agent include a salicylic acid metal compound, a naphthoic acid metal compound, a dicarboxylic acid metal compound, a polymer type compound having sulfonic acid or carboxylic acid in a side chain, a polymer type compound having a sulfonic acid salt or a sulfonic acid esterification product in a side chain, a polymer type compound having a carboxylic acid salt or a carboxylic acid esterification product in a side chain, a boron compound, a urea compound, a silicon compound, and a calixarene.

Examples of the positive charge control agent include a quaternary amount salt, a polymer type compound having a quaternary ammonium salt in a side chain, a guanidine compound, and an imidazole compound.

The toner particle may further include inorganic microparticles as necessary. The inorganic microparticles may be internally added or externally added to the toner particles. Examples of the inorganic microparticles include silica microparticles, titanium oxide microparticles, and aluminum oxide microparticles. These inorganic microparticles may be, for example, hydrophobized with a hydrophobizing agent such as a silane compound, a silicone oil, or a mixture thereof.

The specific surface area of the inorganic microparticles may be 10 $m^2/g$ or more or 50 $m^2/g$ or more, and may be 400 $m^2/g$ or less or 50 $m^2/g$ or less. The content of the inorganic microparticles may be 0.1% by mass or more and may be 10% by mass or less, based on the total amount of the toner particle.

The toner particle may contain iron element, silicon element, and sulfur element, and in addition to these elements, fluorine element may also be further incorporated if necessary. It is desirable that iron element and silicon element are components originating from an aggregating agent and the like. Sulfur element may be a component originating from a production catalyst for a self-adhesive resin, an aggregating agent, and the like. Fluorine element may be a component originating from a production catalyst for a self-adhesive resin and the like.

From the viewpoint that the toner particle can be more suitably used for developing an electrostatically charged image, the content of iron element may be preferably $1.0\times10^3$ ppm or more, and may be $1.0\times10^4$ ppm or less or $5.0\times10^3$ ppm or less. From the viewpoint that the toner particle can be more suitably used for developing an electrostatically charged image, the content of silicon element may be preferably $1.0\times10^3$ ppm or more or $1.5\times10^3$ ppm or more, and may be $5.0\times10^3$ ppm or less or $4.0\times10^3$ ppm or less. The contents of iron element and silicon element can be controlled by regulating the type, amount, and the like of the aggregating agent to be used.

From the viewpoint that the toner particle can be more suitably used for developing an electrostatically charged image, the content of sulfur element may be preferably 500 ppm or more or 1,000 ppm or more, and may be 3,000 ppm or less. The content of sulfur element can be controlled by regulating the types, amounts, and the like of the catalyst and aggregating agent to be used.

From the viewpoint that the toner particle can be more suitably used for developing an electrostatically charged image, the content of fluorine atom may be preferably $1.0\times10^3$ ppm or more or $5.0\times10^3$ ppm or more, and may be $1.0\times10^4$ ppm or less or $8.0\times10^3$ ppm. The content of fluorine atom can be controlled by regulating the type and amount of the catalyst to be used.

The contents of the various elements in the toner particle can be measured by, for example, fluorescent X-ray analysis. Specifically, for example, an X-ray analyzer EDX-720 (manufactured by SHIMADZU CORPORATION) is used as a measuring apparatus, and measurement can be performed under the conditions of an X-ray tube voltage of 50 kV and an amount of sample molding of 30.0 g. The contents of various elements can be determined by utilizing the intensity (cps/μA) from the quantification results derived by fluorescent X-ray analysis.

The average particle size of the toner particles may be, for example, 4 μm or more or 5 μm or more, and may be 7 μm or less or 6 μm or less. The average particle size of the toner particles is a volume average particle size that is determined by the following method.

The volume average particle size of the toner particles is measured by a pore electrical resistance method. Specifically, a Coulter counter (manufactured by Beckman Coulter, Inc.) is used as a measuring apparatus, ISOTON II (manufactured by Beckman Coulter, Inc.) is used as an electrolytic solution, an aperture tube having an aperture diameter of 100 μm is used, and measurement is performed under the conditions of a number of particles measured of 30,000. On the basis of a particle size distribution of the particles thus measured, the volumes occupied by the particles included in divided particle size ranges are cumulated from the smaller diameter side, and the cumulative 50% particle size is designated as the volume average particle size Dv50.

With regard to the toner particle described above, in a case in which the difference between the SP value of the first amorphous polyester resin and the SP value of the second amorphous polyester resin is 0.3 or more, the toner particle can be subjected to phase separation into a phase including the first amorphous polyester resin and a phase including the second amorphous polyester resin, which is attributable to low compatibility of the two resins. FIG. 1 is a TEM image showing an example of such a toner particle. As shown in FIG. 1, the toner particle according to an embodiment has a first phase (Amo1) including the first amorphous polyester resin and a second phase (Amo2) including the second amorphous polyester resin. The first phase and the second phase are separated from each other and form a so-called sea-island structure.

With regard to such a toner particle, as the pendant groups in the first amorphous polyester resin work as crystallization nuclei for crystalline components, it is easier for the crystalline polyester resin to exist in the first amorphous polyester resin rather than in the second amorphous polyester resin, and the crystalline polyester resin that can easily aggregate can be finely dispersed in the first amorphous polyester resin. As shown in FIG. 1, with regard to the toner particle according to an embodiment, the first phase may further include a crystalline polyester resin (Cry) in addition to the first amorphous polyester resin, while the second phase may not include a crystalline polyester resin.

According to an embodiment, the toner particle may have a core-shell structure. The toner particle may have, for example, a core containing a first amorphous polyester resin, a crystalline polyester resin, a colorant, and a wax; and a shell containing a first amorphous polyester resin. Either or both of the core and the shell may further contain a second amorphous polyester resin.

With regard to this toner particle, the details of the first amorphous polyester resin may be the same as described above; however, according to another embodiment, the weight average molecular weight of the first amorphous polyester resin included in the shell may be preferably 5,000 or more, 6,000 or more, or 8,000 or more from the viewpoint of adjusting the Tg to a suitable range, and from the viewpoint of enhancing fixability, the weight average molecular weight may be preferably 80,000 or less, 70,000 or less, 60,000 or less, 50,000 or less, 40,000 or less, 30,000 or less, 25,000 or less, 18,000 or less, or 16,000 or less.

With regard to this toner particle, the details of the second amorphous polyester resin, the crystalline polyester resin, the colorant, and the wax may be respectively the same as described above.

The mass ratio of the content of the first amorphous polyester resin to the content of the crystalline polyester resin (content (mass) of first amorphous polyester resin/content (mass) of crystalline polyester resin) in the core may be, for example, 80/20 or higher or 85/15 or higher, and may be 95/5 or lower or 90/10 or lower.

In a case in which the shell further contains a second amorphous polyester resin that does not have a pendant group in addition to the first amorphous polyester resin having a pendant group, it is preferable that 75% by mass or more of the total amount of the amorphous polyester resins have a pendant group (that is, being the first amorphous polyester resin). Thereby, the core and the shell closely adhere to each other satisfactorily, the crystalline polyester resin and the wax in the core can be prevented from being exposed at the surface of the toner particle, and as a result, the low-temperature fixability and heat-resistant storability of the toner particle can be enhanced. In this case, the first amorphous polyester resin and the second amorphous polyester resin may not satisfy the relationship of SP values as described above. The proportion of the first amorphous polyester resin in the amorphous polyester resins may be preferably 80% by mass or more, 85% by mass or more, 90% by mass or more, or 95% by mass or more, and may be 100% by mass.

The proportion of the core in a toner particle may be preferably 60% by mass or more, 65% by mass or more, or 70% by mass or more, based on the total amount of the toner particle from the viewpoint of having excellent fixability, and from the viewpoint of having excellent heat-resistant storability, the proportion may be preferably 90% by mass or less, 80% by mass or less, or 75% by mass or less. The proportion of the shell in the toner particle may be preferably 10% by mass or more, 20% by mass or more, or 25% by mass or more, based on the total amount of the toner particle from the viewpoint of having excellent heat-resistant storability, and from the viewpoint of having excellent fixability, the proportion may be preferably 40% by mass or less, 35% by mass or less, or 30% by mass or less, based on the total amount of the toner particle.

The toner particle can be used as a one-component system developer. In order to further enhance dot reproducibility and to supply stable images over a long period of time, the toner particle can be mixed with a magnetic carrier and used as a two-component system developer.

Examples of the magnetic carrier include iron oxide; metal particle such as iron, lithium, calcium, magnesium, nickel, copper, zinc, cobalt, manganese, chrome, and rare earth elements; particle of alloys thereof, particle of oxides thereof; magnetic bodies such as ferrites; and a magnetic body-dispersed resin carrier (so-called resin carrier) containing a magnetic body and a binder resin that maintains the magnetic body in a dispersed state.

In a case in which the toner particles are mixed with a magnetic carrier and are used as a two-component system developer, the content of the toner particle may be 2% by mass or more or 4% by mass or more, and may be 15% by mass or less or 13% by mass or less, based on the total amount of the two-component system developer.

The toner particle may be accommodated in, for example, a toner cartridge. More specifically, the toner particle may be accommodated within a container in a toner cartridge. That is, another embodiment is a toner cartridge including a container that accommodates the toner particle described above.

EXAMPLES

Hereinafter, the toner particle will be described in more detail by way of Examples; however, the toner particle is not limited to the Examples.

(Preparation of First Amorphous Polyester Resins 1A to 1F and Comparative Amorphous Polyester Resins 1a and 1b)

Polyhydric alcohols, polycarboxylic acids, and esterification catalysts in the feed amounts shown in Table 1 were introduced into a 5-liter four-necked flask equipped with a nitrogen inlet tube, a dewatering tube, a stirrer, and a thermocouple, and the components were caused to react at 230° C. in a nitrogen atmosphere. Thus, first amorphous polyester resins 1A to 1F and comparative amorphous polyester resins 1a and 1b, all having the physical properties shown in Table 1, were obtained.

TABLE 1

| | | | First amorphous polyester resin | | | | | | Comparative amorphous polyester resin | |
|---|---|---|---|---|---|---|---|---|---|---|
| | | | 1A | 1B | 1C | 1D | 1E | 1F | 1a | 1b |
| Feed amount (% by mole) | Polyhydric alcohol | Propylene oxide adduct of bisphenol A (average number of added moles 2) | 52 | 52 | 51 | 52 | 52 | — | 11 | 51 |
| | | Ethylene oxide adduct of bisphenol A (average number of added moles 2) | — | — | — | — | — | 52 | 40 | — |
| | First polycarboxylic acid | Dodecenyl succinic acid | 13 | 12 | 6 | 14 | 10 | 12 | — | — |

TABLE 1-continued

| | | First amorphous polyester resin | | | | | | Comparative amorphous polyester resin | |
|---|---|---|---|---|---|---|---|---|---|
| | | 1A | 1B | 1C | 1D | 1E | 1F | 1a | 1b |
| Second polycarboxylic acid | Terephthalic acid | 34 | 36 | 42 | 34 | 37 | 36 | 49 | 49 |
| SP value | | 10.8 | 10.8 | 10.9 | 10.7 | 10.9 | 11.5 | 11.8 | 11.1 |
| Weight average molecular weight | | 8087 | 10575 | 10658 | 9170 | 8664 | 9748 | 10253 | 10685 |

Meanwhile, in Table 1, the SP value is a value determined from the monomer composition by Fedors calculation formula:

$$SP\ \text{value}=(\Sigma\Delta e/\Sigma\Delta v)^{1/2}$$

wherein Δe represents the evaporation energy of an atom or an atomic group; and Δv represents the molar volume of an atom or an atomic group.

Into a 3-liter double-jacketed reactor, 300 g of a first amorphous polyester resin or a comparative amorphous polyester resin, 250 g of methyl ethyl ketone, and 50 g of isopropyl alcohol were introduced, and in an environment at about 30° C., the interior of the reaction vessel was stirred using a semi-moon type impeller, and the resin was dissolved. While a resin solution thus obtained was stirred, 20 g of a 5% aqueous solution of ammonia was slowly added into the reaction vessel, and subsequently 1,200 g of water was added at a rate of 20 g/min to thereby produce an emulsion. Subsequently, a mixed solvent of methyl ethyl ketone and isopropyl alcohol was removed from the emulsion by a reduced pressure distillation method until the concentration of the first amorphous polyester resin as a solid component became 20% by mass, and a latex of the first amorphous polyester resin or the comparative amorphous polyester resin was obtained.

(Preparation of Second Amorphous Polyester Resins 2A and 2B and Comparative Amorphous Polyester Resin 2a)

Second amorphous polyester resins 2A and 2B and comparative amorphous polyester resin 2a were synthesized in the same manner as in the case of the first amorphous polyester resins 1A to 1F, except that the polyhydric alcohols and polycarboxylic acids in the feed amounts shown in Table 2 were used, and then latexes of these resins were obtained.

TABLE 2

| | | | Second amorphous polyester resin | | Comparative amorphous polyester resin |
|---|---|---|---|---|---|
| | | | 2A | 2B | 2a |
| Feed amount (% by mole) | Polyhydric alcohol | Propylene oxide adduct of bisphenol A (average number of added moles 2) | 47 | 50 | 52 |
| | | Ethylene oxide adduct of bisphenol A (average number of added moles 2) | 5 | — | — |
| | Polycarboxylic acid | Isophthalic acid | 41 | 40 | 28 |
| | | Adipic acid | 5 | 8 | — |
| | | Trimellitic anhydride | 2 | 2 | 2 |
| | | Dodecenyl succinic acid | — | — | 18 |
| SP value | | | 11.3 | 11.0 | 10.6 |
| Weight average molecular weight | | | 56473 | 56204 | 46952 |

(Preparation of Crystalline Polyester Resin)

Into a 500-milliliter separable flask, 133 g of 1,9-nonanediol (manufactured by Wako Pure Chemical Industries, Ltd.), 167 g of 1,12-dodecane dicarboxylic acid (manufactured by Wako Pure Chemical Industries, Ltd.), and an esterification catalyst were introduced. Subsequently, nitrogen was introduced into the flask, and while the interior of the flask was stirred with a stirring apparatus, a mixture of 1,9-nonanediol and the esterification catalyst was heated to 80° C. and melted. Subsequently, while the interior of the flask was stirred, the temperature of the mixed solution inside the flask was increased to 97° C. Subsequently, a vacuum (10 mPa-s or less) was drawn inside the flask, and while the interior of the flask was stirred, a dehydration condensation reaction between 1,9-nonanediol and 1,12-dodecane dicarboxylic acid was carried out for 5 hours at 97° C. Thus, a crystalline polyester resin was obtained. The weight average molecular weight of this crystalline polyester resin was 5,600, and Tg2nd-dH was 149 J/g. Subsequently, a latex of the crystalline polyester resin was obtained by the same procedure as in the case of the latex of the amorphous polyester resin, except that the crystalline polyester resin was used instead of the amorphous polyester resin.

(Preparation of Colorant Dispersion Liquid)

10 g of an anionic reactive emulsifier (HS-10: manufactured by DKS Co. Ltd.) was introduced into a milling bath together with 60 g of a Cyan pigment (C.I. Pigment Blue 15:3: manufactured by Clariant AG). Into this, 400 g of glass beads having a diameter of 0.8 to 1 mm were introduced, and milling was performed at normal temperature. Thus, a colorant dispersion liquid was obtained.

Test Example 1-1

(Preparation of Toner Particles)

In a 3 L reactor, 500 g of deionized water, 443 g of the latex of the first amorphous polyester resin 1A, 190 g of the latex of the second amorphous polyester resin 2A, and 210 g of the latex of the crystalline polyester resin were added, and subsequently, 60 g of the colorant dispersion liquid, 80 g of a wax dispersion liquid (SELOSOL P-212: manufactured by CHUKYO YUSHI CO., LTD.), and 70 g of polysilicato-iron (PSI-100, manufactured by SUIDO KIKO KAISHA, LTD.) as an aggregating agent were respectively added. While these were stirred using a homogenizer (ULTRA-TURRAX T50 (trade name) manufactured by IKA-Werke GmbH & CO. KG), the temperature of the mixed solution in the flask was increased to 45° C. at a rate of 1° C./min. Subsequently, the temperature of the aggregate reaction liquid was increased at a rate of 0.2° C./min to continue an aggregation reaction, and primary aggregated particles (cores) having a volume average particle size of 4 to 6 μm were obtained. Furthermore, 147 g of a latex of the first amorphous polyester resin 1A and 63 g of a latex of the second amorphous polyester resin 2A were added, the mixture was caused to aggregate for 30 minutes, and shell was formed so as to cover the primary aggregated particles.

Next, a 0.1 N aqueous solution of NaOH was added, and the pH of the mixed liquid was adjusted to 9.5. After a lapse of 20 minutes, the temperature of the mixed liquid was increased, the mixed liquid was subjected to fusing for 3 hours or longer and 5 hours or shorter, and thereby secondary aggregated particles having a volume average particle size of 4 to 7 μm were obtained. Into this aggregated reaction liquid, ice of deionized water was introduced at a rate of introduction of 100 ml/10 sec, the aggregated reaction liquid was cooled to 28° C. or lower, subsequently particles were separated through a filtration process and dried. Thus, a toner particle precursor was obtained.

To 100 parts by mass of the toner particle precursor obtained as described above, 1.3 parts by mass of small particle-sized silica R8200 (average particle size 12 nm, manufactured by NIPPON AEROSIL CO., LTD.), 1.7 parts by mass of medium particle-sized silica RX50 (volume average particle size 40 nm, manufactured by NIPPON AEROSIL CO., LTD.), 1.0 part by mass of large particle-sized silica (X24-9600A-80, volume average particle size 80 nm, manufactured by Shin-Etsu Chemical Co., Ltd.), and 0.5 part by mass of titanium oxide (volume average particle size 15 nm, JMT1501B, manufactured by Tayca Corporation) were added, and the mixture was mixed for 3 minutes at 6,000 rpm using a Powder mixer (Model No. KM-LS-2K, manufactured by KM TECH Co., Ltd.). Thus, toner particles were obtained.

Test Examples 1-2 to 1-11

Toner particles were obtained in the same manner as in Test Example 1-1, except that the combinations shown in Table 3 were used instead of the combination of the first amorphous polyester resin 1A and the second amorphous polyester resin 2A. In Table 3, the differences between the SP values of the amorphous polyester resins (ΔSP value) are also shown together.

The following evaluations were performed for each of the obtained toner particles. The results are shown in Table 3.

<Evaluation of Low-Temperature Fixability>

An OHP sheet from which a square having a size of 25 mm×40 mm had been hollowed out was arranged to face a masked 90 g/m$^2$ paper, and toner particles were scraped off from above a SUS316 40.04×300 mesh (sieve opening 0.04 mm) at an applied voltage of 1 kV such that the weight of the toner on the paper would be 0.36 mg/cm$^2$.

An external fixing device obtained by modifying a fixing device of MultiXpress 7 (manufactured by Samsung Electronics Co., Ltd.) was used, and under the conditions of a heat belt linear velocity of 280 mm/sec, the heat belt surface temperature and the surface temperature of a pressure roller were monitored using a radiation thermometer (ε 0.98). When the surface temperature of the pressure roller became −20° C. with respect to the heat belt temperature, paper having an unfixed image printed thereon was fed.

The image density of the image on the fed paper was measured using a colorimeter (X-rite eXact, manufactured by X-Rite, Incorporated). Scotch (registered trademark) tape was attached to the image, a sheet of paper having a basis weight of 60 g/m$^3$ was interposed therebetween, a weight of 500 g was reciprocated five times, and then the tape was peeled off at 180°. The image density after tape peeling was measured, and the image density after peeling with respect to the image density before peeling was designated as the fixing strength. The above-described operation was carried out by changing the heat belt temperature, and the temperature at which the fixing strength became 90% was designated as the lowest fixing temperature. It can be said that when the lowest fixing temperature is 135° C. or lower, the low-temperature fixability is excellent.

<Evaluation of Fixable Temperature Range>

Paper feeding of paper having an unfixed image printed thereon was carried out by increasing the heat belt surface temperature by 5° C. each time in the same manner as in the evaluation of low-temperature fixability, except that the 90 g/m$^2$ paper was changed to a 60 g/m$^2$ paper, and the maximum temperature at which image was not generated at the rear end of the paper thus fed was designated as the highest fixing temperature at which hot offset does not occur. The difference between this highest fixing temperature and the above-described lowest fixing temperature was calculated as the fixable temperature range. When the fixable temperature range is 30° C. or higher, it can be said that the temperature range capable of fixing is broad and excellent.

<Evaluation of Heat-Resistant Storability>

The change in the degree of aggregation at the time of leaving the toner particles to stand for 100 hours in an environment at a temperature of 50° C./a humidity of 80 RH % was measured. For the degree of aggregation, a POWDER TESTER (manufactured by HOSOKAWA MICRON CORPORATION, sieves 53, 45, and 38 μm) was used. When the sieves were mounted to be overlapped in the order of 53 μm, 45 μm, and 38 μm from the top, 2 g of the toner particles were loaded on the sieve at the top, and the sieves were vibrated, the mass of toner particles remaining on each of the sieves was measured (amplitude 1 mm, vibration time for 40 seconds), and the degree of aggregation was calculated according to the following formula:

$$\text{Degree of aggregation}=(T/2+C/2\times(3/5)+B/2\times(1/5))/100$$

wherein T represents mass of toner particles remaining on the sieve in the upper row; C represents mass of toner particles remaining on the sieve in the middle row; and B represents mass of toner particles remaining on the sieve in the lower row.

The ratio of the degree of aggregation after leaving for 100 hours with respect to the degree of aggregation before leaving for 100 hours in the above-described environment (after leaving/before leaving) was designated as the ratio of the degree of aggregation. When the ratio of the degree of aggregation is 5 or lower, it can be said that the heat-resistant storability is excellent.

TABLE 3

| | | Test Example | | | | | | | | | | |
|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 |
| Type of first amorphous polyester resin | | 1A | 1B | 1C | 1D | 1E | 1D | 1F | 1B | Comparative 1a | Comparative 1b | 1B |
| Type of second amorphous polyester resin | | 2A | 2A | 2A | 2A | 2A | 2B | 2B | 2A | 2A | 2A | Comparative 2a |
| ΔSP value | | 0.5 | 0.5 | 0.4 | 0.6 | 0.4 | 0.3 | 0.5 | 0.2 | 0.5 | 0.2 | 0.2 |
| Evaluation results | Lowest fixing temperature (° C.) | 112 | 115 | 129 | 118 | 116 | 118 | 115 | 115 | 143 | 141 | 119 |
| | Fixable temperature range (° C.) | 48 | 45 | 36 | 47 | 39 | 37 | 45 | 25 | 27 | 24 | 16 |
| | Ratio of degree of aggregation | 1.78 | 2.72 | 1.08 | 2.24 | 2.10 | 2.11 | 1.86 | 3.11 | 1.05 | 1.02 | 8.50 |

As shown in the above description, according to an embodiment, toner particle having a ΔSP value of 0.3 or greater can become simultaneously excellent in terms of all of the low-temperature fixability (lowest fixing temperature is 135° C. or lower), the fixable temperature range (fixable temperature range is 30° C. or higher), and the heat-resistant storability (ratio of the degree of aggregation is 5 or lower).

Subsequently, specific examples of toner particle according to another embodiment will be described below.

(Preparation of First Amorphous Polyester Resins 1G to 1M)

First amorphous polyester resins 1G to 1M were synthesized in the same manner as in the case of the first amorphous polyester resins 1A to 1F, except that the polyhydric alcohols and polycarboxylic acids in the feed amounts shown in Table 4 were used, and then latexes of these resins were obtained.

First amorphous polyester resins 1G to 1M were synthesized in the same manner as in the case of the first amorphous polyester resins 1A to 1F, except that the polyhydric alcohols and polycarboxylic acids in the feed amounts shown in Table 4 were used, and then latexes of these resins were obtained.

TABLE 4

| | | | First amorphous polyester resin | | | | | |
|---|---|---|---|---|---|---|---|---|
| | | | 1G | 1H | 1I | 1J | 1K | 1L |
| Feed amount (% by mole) | Polyhydric alcohol | Propylene oxide adduct of bisphenol A (average number of added moles 2) | 52 | 51 | 50 | 49 | 52 | 49 |
| | First polycarboxylic acid | Dodecenyl succinic acid | 12 | 12 | — | — | 6 | 6 |
| | | Isooctadecenyl succinic acid | — | — | 2 | 2 | — | — |
| | Second polycarboxylic acid | Terephthalic acid | 36 | 35 | — | — | 42 | 42 |
| | | Isophthalic acid | — | — | 47 | 46 | — | — |
| | | Trimellitic anhydride | — | 2 | 1 | 3 | — | 3 |
| Weight average molecular weight | | | 10575 | 79000 | 13000 | 75000 | 10658 | 85000 |

(Preparation of Second Amorphous Polyester Resins 2C and 2D)

Second amorphous polyester resins 2C and 2D were synthesized in the same manner as in the case of the first amorphous polyester resins 1A to 1F, except that the polyhydric alcohols and polycarboxylic acids in the feed amounts shown in Table 5 were used, and then latexes of these resins were obtained.

TABLE 5

| | | | Second amorphous polyester resin | |
|---|---|---|---|---|
| | | | 2C | 2D |
| Feed amount (% by mole) | Polyhydric alcohol | Propylene oxide adduct of bisphenol A (average number of added moles 2) | 49 | 36 |
| | | Ethylene oxide adduct of bisphenol A (average number of added moles 2) | — | 14 |
| | Polycarboxylic acid | Terephthalic acid | 48 | 47 |
| | | Trimellitic anhydride | 3 | 3 |
| Weight average molecular weight | | | 56200 | 56473 |

Test Examples 2-1 to 2-10

Toner particles were obtained in the same manner as in Test Example 1-1, except that the type of the amorphous polyester resin used for the production of the core of the toner particle was changed to the first amorphous polyester resin 1G only, and the types of the first amorphous polyester resin and the second amorphous polyester resin used for the production of the shell, and the composition of the binder resin in the toner particle was changed as shown in Table 6. In Table 6, the proportion (% by mass) occupied by the first amorphous polyester resin in the amorphous polyester resins in the shell is also shown together.

For each of the toner particle thus obtained, the temperature T1 at which the storage modulus of the toner particle became $1\times10^5$ Pa was measured by the following method, and also, the low-temperature fixability and the heat-resistant storability were evaluated by the above-described methods. The results are shown in Table 6.

As a measuring apparatus, a rotating flat plate type rheometer "ARES" (manufactured by TA Instruments, Inc.) was used. As a measurement sample, a sample obtained by pressure molding 0.25 g at 20 MPa for 1 minute using a tablet molding machine was used. The storage modulus G' at the time of increasing the temperature from 40° C. to 180° C. under the conditions of a rate of temperature increase of 2° C./min, a frequency of 10 Hz, and a strain control mode (strain amount 0.01% to 3%) was measured at an increment of 1° C., and the first temperature at which the storage modulus G' was below $1\times10^5$ Pa was designated as T1.

a second amorphous polyester resin having no pendant group; and a crystalline polyester resin, wherein a difference between a Solubility Parameter (SP) value of the first amorphous polyester resin and an SP value of the second amorphous polyester resin is 0.3 or more.

2. The toner particle according to claim 1, wherein the first amorphous polyester resin comprises, as monomer units, a polyhydric alcohol, a first polycarboxylic acid having a branch chain having 3 or more carbon atoms, the branch chain constituting the pendant group, and a second polycarboxylic acid having no branch chain having 3 or more carbon atoms.

3. The toner particle according to claim 2, wherein a content of the first polycarboxylic acid is 1% by mole or more and 15% by mole or less based on a total amount of the monomer units.

4. The toner particle according to claim 1, wherein the second amorphous polyester resin comprises, as monomer units, a polyhydric alcohol and a polycarboxylic acid having no branch chain having 3 or more carbon atoms.

TABLE 6

| | | | Test Example | | | | | | | | | |
|---|---|---|---|---|---|---|---|---|---|---|---|---|
| | | | 2-1 | 2-2 | 2-3 | 2-4 | 2-5 | 2-6 | 2-7 | 2-8 | 2-9 | 2-10 |
| Type of amorphous polyester resins in shell | First amorphous polyester resin | | 1G | 1G | 1G | 1G | 1G | 1H | 1I | 1J | 1K | 1L |
| | Second amorphous polyester resin | | 2D | 2C | 2D | 2D | 2D | 2D | 2D | 2D | 2D | 2D |
| Composition of binder resin (% by mass) | Core | First amorphous polyester resin | 57.6 | 57.6 | 60.2 | 60.2 | 60.2 | 60.2 | 60.2 | 60.2 | 60.2 | 60.2 |
| | | Crystalline polyester resin | 14.4 | 14.4 | 25.8 | 25.8 | 25.8 | 25.8 | 25.8 | 25.8 | 25.8 | 25.8 |
| | Shell | First amorphous polyester resin | 19.6 | 19.6 | 12.6 | 11.2 | 13.72 | 11.2 | 11.2 | 11.2 | 11.2 | 11.2 |
| | | Second amorphous polyester resin | 8.4 | 8.4 | 1.4 | 2.8 | 0.28 | 2.8 | 2.8 | 2.8 | 2.8 | 2.8 |
| Proportion occupied by first amorphous polyester resin in amorphous polyester resins in shell (% by mass) | | | 70 | 70 | 90 | 80 | 98 | 80 | 80 | 80 | 80 | 80 |
| Evaluation results | Temperature T1 (° C.) | | 90 | 90 | 82 | 84.5 | 80.5 | 84.5 | 84 | 84.5 | 85 | 88 |
| | Lowest fixing temperature (° C.) | | 129 | 129 | 114 | 119 | 112 | 120 | 120 | 120 | 120 | 126 |
| | Ratio of degree of aggregation | | 2.1 | 1.1 | 3.1 | 3.7 | 1.9 | 3.5 | 4.1 | 4.2 | 3.8 | 3.2 |

As described above, according to another embodiment, the toner particle can become toner particle having especially excellent low-temperature fixability and heat-resistant storability when the proportion occupied by the first amorphous polyester resin in the amorphous polyester resins in the shell is 75% by mass or more.

Hereinbefore, various examples of the toner particle have been specifically described; however, it is obvious to those having ordinary skill in the art that various modifications and alterations can be made to the extent that is maintained in the scope of the spirit of the claims. That is, all alterations are intended to be included to the extent that is maintained in the scope of the spirit described in the claims.

The invention claimed is:

1. A toner particle comprising:

a binder resin;

a colorant; and a wax, wherein the binder resin comprises:

a first amorphous polyester resin having a pendant group;

5. The toner particle according to claim 1, wherein a weight average molecular weight of the first amorphous polyester resin is 5,000 or more and 30,000 or less.

6. The toner particle according to claim 1, wherein a weight average molecular weight of the second amorphous polyester resin is 30,000 or more and 80,000 or less.

7. The toner particle according to claim 1, wherein a weight average molecular weight of the crystalline polyester resin is 5,000 or more and 15,000 or less.

8. The toner particle according to claim 1, wherein a mass ratio of a content of the first amorphous polyester resin to a content of the second amorphous polyester resin is 60/40 or higher.

9. The toner particle according to claim 1, wherein a total content of the first amorphous polyester resin and the second amorphous polyester resin is 70% by mass or more and 90% by mass or less based on a total amount of the binder resin.

10. The toner particle according to claim 1, wherein a content of the crystalline polyester resin is 8% by mass or more and 30% by mass or less based on the total amount of the binder resin.

11. The toner particle according to claim 1, wherein a content of the binder resin is 40% by mass or more and 90% by mass or less based on a total amount of the toner particle.

12. The toner particle according to claim 1, wherein the toner particle has a first phase comprising the first amorphous polyester resin, and a second phase comprising the second amorphous polyester resin, the second phase being separated from the first phase.

13. The toner particle according to claim 12, wherein the first phase comprises the crystalline polyester resin.

14. The toner particle according to claim 13, wherein the second phase does not comprise the crystalline polyester resin.

15. A toner particle comprising:

a core; and a shell covering the core, wherein the core comprises: a binder resin; a colorant; and a wax, wherein the binder resin comprises:

an amorphous polyester resin having a pendant group; and a crystalline polyester resin, and wherein the shell comprises an amorphous polyester resin, wherein 75% by mass or more of the amorphous polyester resin of the shell has a pendant group.

16. The toner particle according to claim 15, wherein a Solubility Parameter (SP) value of the amorphous polyester resin of the core is 10.0 or more and 12.0 or less.

17. The toner particle according to claim 15, wherein a mass ratio of the amorphous polyester resin of the core to the crystalline polyester resin is 80/20 or higher.

18. The toner particle according to claim 15, wherein a proportion of the core is 60% by mass or more.

19. The toner particle according to claim 15, wherein the crystalline polyester resin is a reaction product between a polyhydric alcohol and a polycarboxylic acid.

20. The toner particle according to claim 15, wherein a proportion of the shell in the toner particle is 25% by mass or more.

* * * * *